United States Patent [19]

Mehoudar

[11] Patent Number: 5,279,462
[45] Date of Patent: Jan. 18, 1994

[54] FLUID FLOW CONTROL UNIT

[75] Inventor: Raphael Mehoudar, Tel-Aviv, Israel

[73] Assignee: Hydroplan Engineering Ltd., Tel-Aviv, Israel

[21] Appl. No.: 778,565

[22] Filed: Oct. 17, 1991

[30] Foreign Application Priority Data

Oct. 25, 1990 [IL] Israel ................................ 96106

[51] Int. Cl.⁵ .............................................. B05B 15/00
[52] U.S. Cl. .................................. 239/542; 239/547; 239/533.13
[58] Field of Search ............... 239/542, 547, 533.1, 239/533.13, 533.14; 138/42, 43, 46; 264/249

[56] References Cited

U.S. PATENT DOCUMENTS

| | | | |
|---|---|---|---|
| 2,431,238 | 11/1947 | Friedman | 264/249 |
| 3,970,273 | 7/1976 | Tanner | 264/249 |
| 3,998,427 | 12/1976 | Bentley | 239/542 |
| 4,084,749 | 4/1978 | Drori | 239/547 |
| 4,105,162 | 8/1978 | Drori | 239/542 |
| 4,196,753 | 4/1980 | Hammarstedt | 138/43 |
| 4,209,133 | 6/1980 | Mehoudar | 239/533.13 |
| 4,992,219 | 2/1991 | Meunier | 264/249 |

FOREIGN PATENT DOCUMENTS

| | | | |
|---|---|---|---|
| 48310 | 10/1983 | France | 239/542 |
| 48811 | 11/1988 | France | 239/542 |
| 0935011 | 6/1982 | U.S.S.R. | 239/542 |

Primary Examiner—Andres Kashnikow
Assistant Examiner—Christopher G. Trainor
Attorney, Agent, or Firm—Burgess, Ryan & Wayne

[57] ABSTRACT

An irrigation emitter unit is provided comprising an outer member of substantially cylindrical shape and having a tapering base portion with fluid flow coupling means; an inwardly directed peripherally flanged edge portion of the outer member; an inner member having a body portion of substantially cylindrical shape substantially sealingly fitted within the outer member and having a cover portion formed integrally therewith; a peripheral edge portion of the cover portion juxtaposed below the flanged edge portion of the outer member; an elongated groove formed in the cylindrical surface of the body portion; a cavity formed in the body portion and communicating at one end thereof with a fluid flow inlet; an inwardly directed flange formed integrally with the walls of the cavity; and a resiliently flexible membrane located within the unit.

4 Claims, 3 Drawing Sheets

PRIOR ART

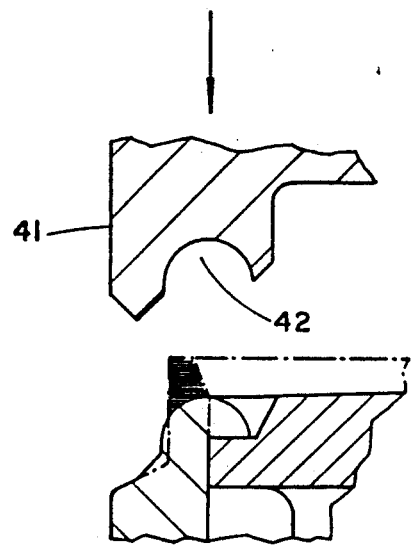
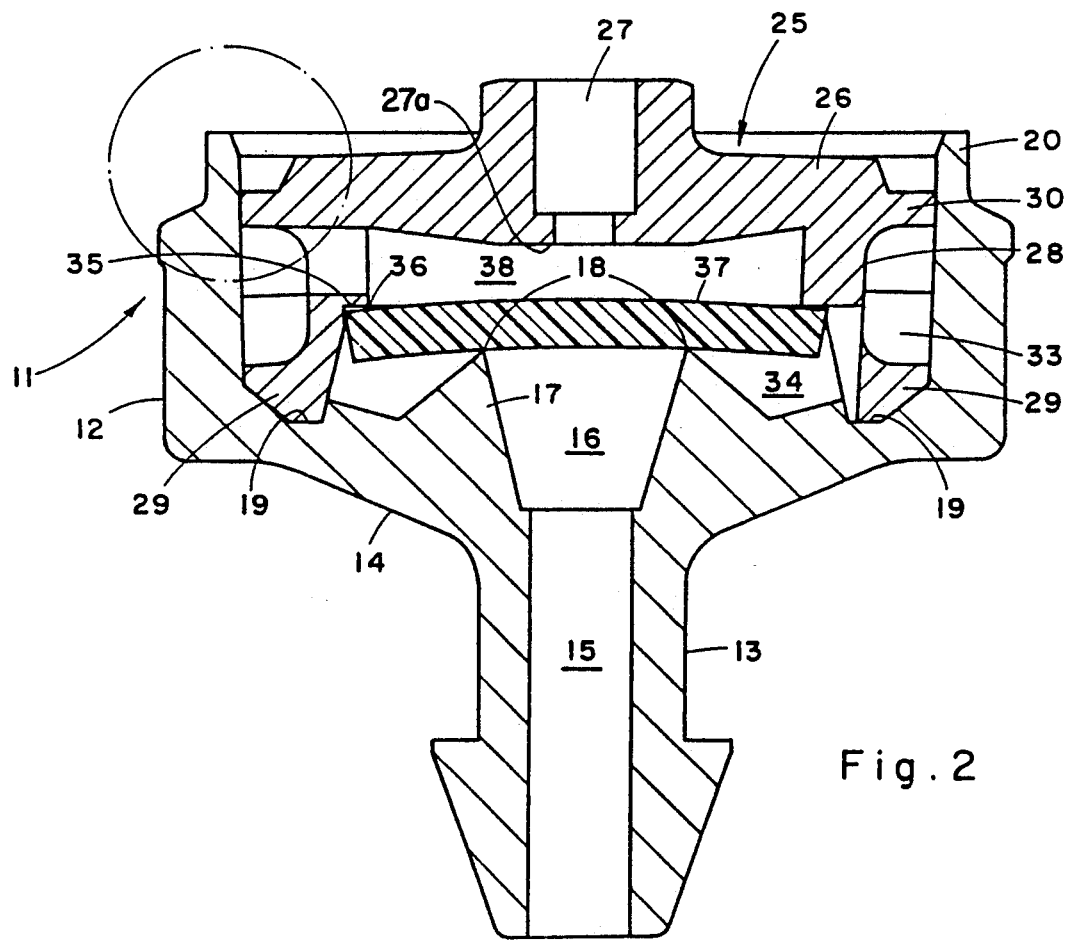
Fig. 3
Fig. 2

FLUID FLOW CONTROL UNIT

FIELD OF THE INVENTION

This invention relates to an improved fluid flow control unit, such as an irrigation emitter unit, and to a process for the manufacture thereof.

BACKGROUND OF THE INVENTION

Known irrigation emitter units (constituting fluid flow control units of the kind with which the present invention is concerned) comprise, in many cases, an inner member retainably fitted within an outer member, wherein the two members are respectively provided with means which allow for the retainable fitting of the inner member within the outer member and which ensure that, once fitted, the two members are effectively secured to each other, thereby minimising the danger that they inadvertently come apart during use.

It is an object of the present invention to provide a new and improved fluid flow control unit and a process for the manufacture thereof, wherein the constituent members of the flow control unit are effectively retained one within the other, and wherein the mode of retention is itself conducive to the production of an improved unit.

BRIEF SUMMARY OF THE INVENTION

According to the present invention there is provided, in a process for the manufacture of a fluid flow control unit comprising an inner member retainable fitted within an outer member, the improvement comprising the steps of inserting said inner member into said outer member with a peripheral edge portion of the outer member projecting beyond an adjacent peripheral edge portion of the inner member; and distortably displacing the peripheral edge portion of the outer member on to the peripheral edge portion of the inner member so as to retain the inner member within the outer member.

Preferably, the distortable displacement of the peripheral edge portion of the outer member is carried out by an ultrasonic process and the displacement is accompanied by the effective welding of the under surface of the displaced peripheral edge portion of the outer member to the upper surface of the peripheral edge portion of the inner member.

According to a further aspect of the present invention, there is provided a fluid flow control unit when manufactured in accordance with the previously defined process and comprising an outer member formed of a plastics material; an inwardly directed peripheral flanged edge portion of the outer member; an inner member formed of a like plastics material and fitted within the outer member; a peripheral edge portion of the inner member juxtaposed below the flanged edge portion of the outer member, an under surface of the flanged edge portion being welded to an upper surface of the peripheral edge portion whereby said inner member is retained within the outer member; a fluid flow control path formed in said unit and defined between adjacent faces of said outer and inner members; a fluid flow inlet formed in one of said members and communicating with one end of said fluid flow control path; and a fluid flow outlet formed in the other of said members and communicating with an opposite end of said fluid flow control path.

Preferably, the fluid flow control unit is constituted by an irrigation emitter unit.

BRIEF SUMMARY OF THE DRAWINGS

For a better understanding of the present invention, and to show how the same may be carried out in practice, reference will now be made to the accompanying drawings in which:

FIG. 2 is a longitudinally sectioned view of an irrigation emitter unit in accordance with the invention in a first manufacturing stage thereof;

FIG. 3 illustrates schematically a final manufacturing stage of the emitter unit shown in FIG. 2.

BRIEF DESCRIPTION OF KNOWN IRRIGATION EMITTER UNIT

Figure 1:
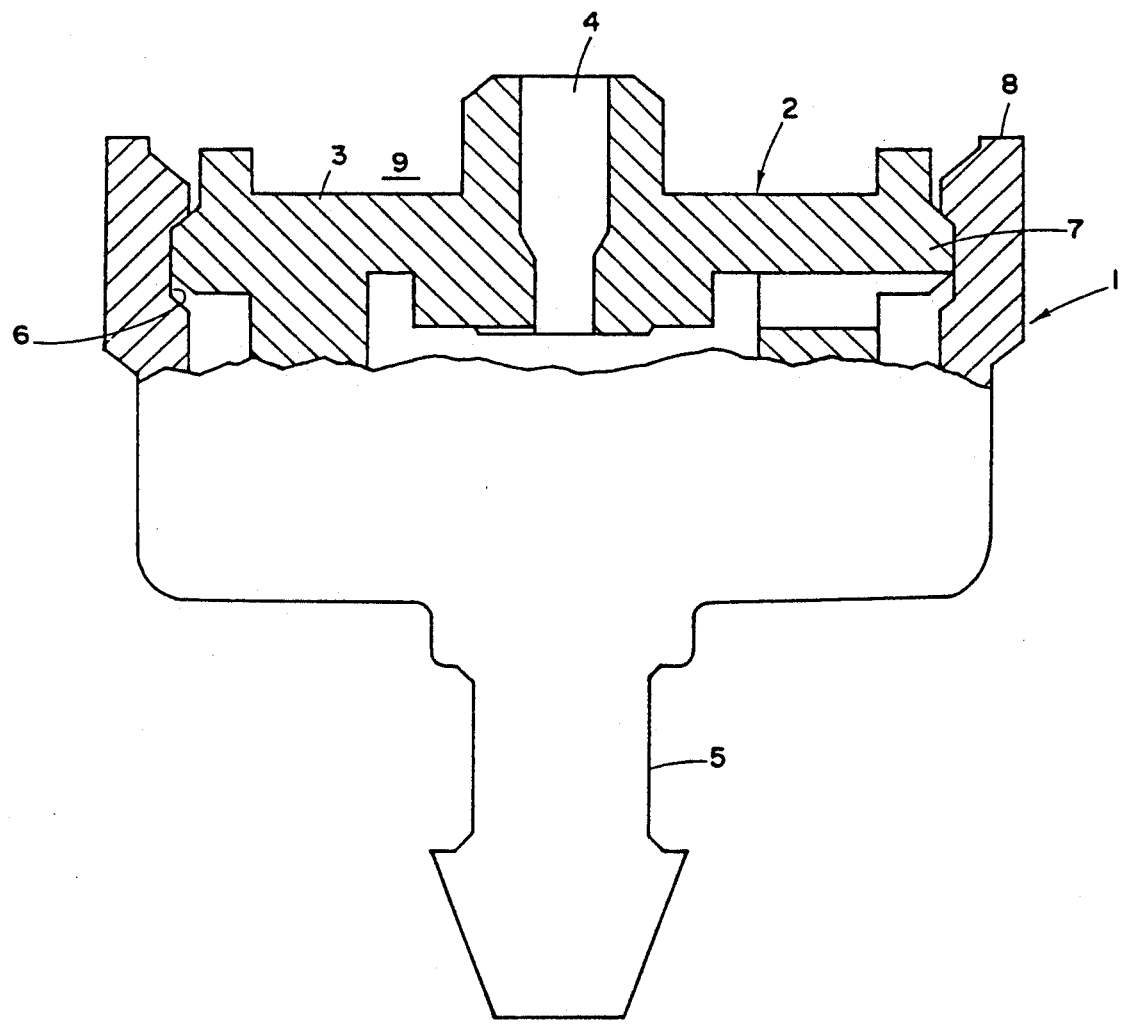
FIG. 1 is a partially sectioned side elevation view of a known form of irrigation emitter unit.

As seen in FIG. 1, a known irrigation emitter unit comprises an outer cylindrical member 1 and an inner member 2 having a substantially planar upper surface 3 and through which extends a central outlet port 4. The outer member 1, on the other hand, is provided with a coupling nipple 5 by which the emitter unit can be coupled to an irrigation pipe (not shown). The outer and inner members are formed of like plastics materials.

As can be seen, there is formed close to the mouth of the outer member 1 and in the inner surface thereof a peripheral groove 6 constituting an undercut, and having upper and lower sloping edges. The inner member 2, on the other hand, is formed with a peripheral flanged rib 7 which has correspondingly sloping edges. As seen in FIG. 1, when the emitter unit is assembled and the inner member is forced into position as shown, the flanged rib 7 is located within the peripheral groove 6 and is retained therein.

This known construction is disadvantageous for various reasons, among which the following may be mentioned:

As a consequence of the provision of the undercut groove 6 in the upper end portion of the outer member 1, and in order to avoid the weakening of the upper edge 8 of the outer member 1, this upper end must project sufficiently beyond the undercut 6 as seen in the drawings. By virtue of this relatively high degree of projection of the upper end 8 beyond the undercut, and in order to satisfy constructional requirements of the emitter unit, the upper surface 3 of the inner member 2 is effectively depressed with respect to the upper edge of the end 8 of the outer member, and this gives rise to the production of an undesirable recess 9 on the upper surface 3 of the inner portion 2 wherein water can accumulate.

Furthermore, the shape and mode of location of the flanged rib 7 within the recess 6 are such that the effective retention of the inner member 2 within the outer member 1 cannot always be ensured, especially when a relatively high pressure develops within the emitter unit, in which case the inner member 2 can well be expelled from the outer member 1. Thus, the formation of the undercut recess 6 with sloping edges is essentially dictated by standard plastic molding technology and the presence of these sloping edges renders the retention of the inner member 2 within the outer member 1 even more difficult.

These and other disadvantages of the known construction are overcome or considerably reduced with the construction in accordance with the invention, which will now be described in detail.

DETAILED DESCRIPTION OF PREFERRED EMBODIMENT

FIG. 2 of the drawings shows the respective components of an irrigation emitter unit assembled together prior to the final operation designed to ensure the effective sealing retention of the components one within the other. As seen, the unit comprises an outer member 11 consisting of a substantially cylindrical casing portion 12, a coupling nipple portion 13, the portions 12 and 13 being integrally coupled together via a sloping portion 14. The coupling nipple 13 defines a central inlet port 15 which communicates with a central portion of an inlet control chamber 16 formed in the outer member 11. The sloping portion 14 is formed integrally with an annular support 17 within which is defined the inlet control chamber 16, the annular support 17 tapering towards a circular apex 18.

An annular groove 19 is formed in an upper surface of the tapering portion 14 adjacent the inner surface of the cylindrical portion 12.

The cylindrical portion 12 is formed integrally with an upwardly projecting terminal portion 20 which is of reduced thickness as compared with the remainder of the cylindrical portion 12.

An inner member 25 comprises an upper, substantially planar annular portion 26 having a central outlet port 27 with an inner outlet aperture rim 27a and being formed with a downwardly depending skirt portion 28, the latter terminating in a bevelled end portion 29 which fits within the annular groove 19.

The upper portion 26 is formed with an outer peripheral flange 30 having an outer annular surface which fits sealingly against the inner annular surface of the cylindrical portion 12. Similarly, the bevelled end portion 29 is formed with an outer annular surface which fits sealingly against the inner surface of the cylindrical portion 12.

Defined between the outer surface of the skirt portion 28 and the inner surface of the cylindrical portion 12 is a flow reducing path 33. One end of the flow reducing path 33 communicates with an annular region 34 defined between an inner surface of the skirt portion 28 and an outer surface of the support 17. An opposite end of the flow reducing path 33 communicates with an upper region defined within the inner member 25.

An inwardly directed annular shoulder 35 having an innermost corner 36 is formed on the inner surface of the skirt portion 28.

A circular flexible membrane 37 is centrally supported at its under surface on the circular tip 18 of the support 17 and, at its outer surface against the circular corner 36 of the shoulder 35. Thus, as seen in the drawings, the membrane is so supported as to be slightly flexed upwardly in the center thereoy.

Thus, the membrane 37 defines, together with the support 17, an inlet control chamber 16 and, with the under surface of the planar portion 26, an outlet control chamber 38.

Figure 4:
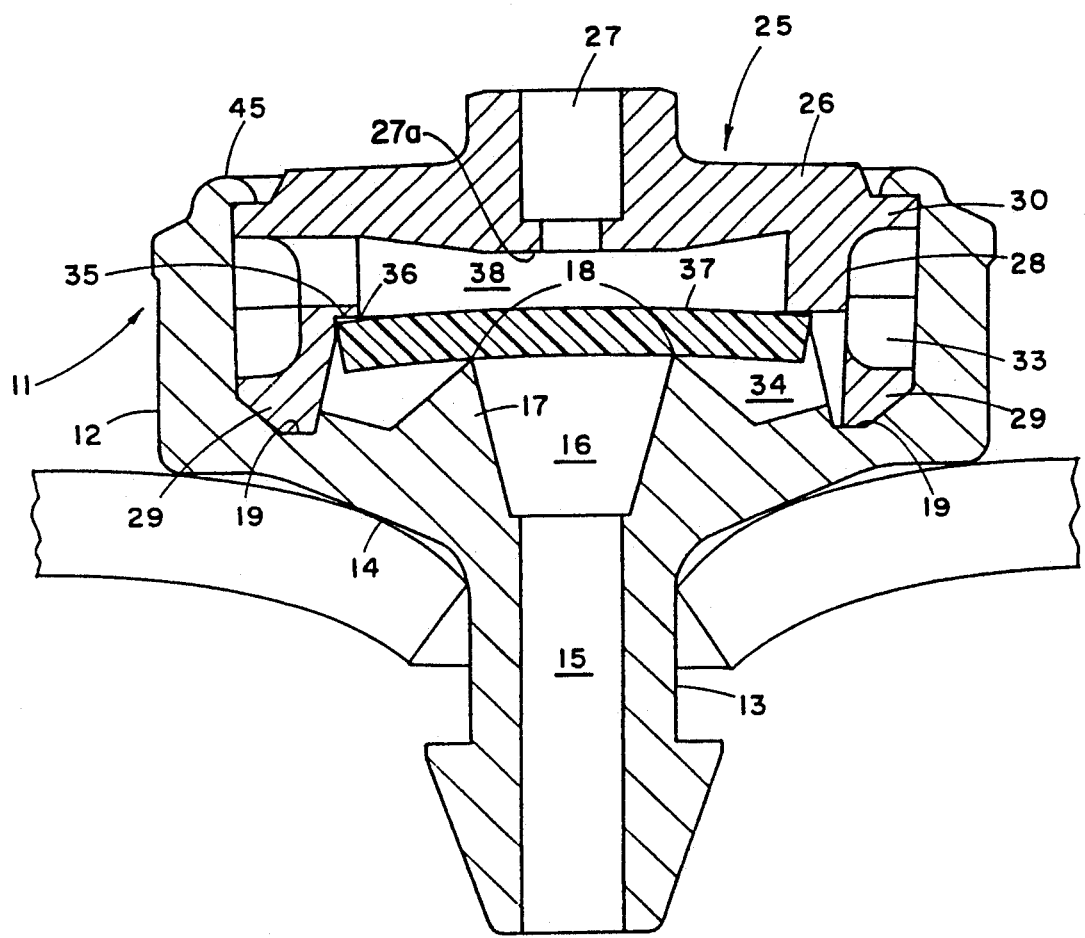
FIG. 4 is a longitudinally sectioned view of the completed emitter unit in accordance with the invention.

When now the assembly of the emitter unit just described is to be completed by the sealable retaining of the inner member 25 within the outer member 11, an ultrasonic distortion is carried out whereby, as shown in FIG. 3 of the drawings, an ultrasonic tip 41, having a suitably shaped annular spherical recess 42, is brought into contact with the upper end portions of the assembled unit and the process of staking results in the melting and reforming of the terminal portion 20 (the melted and re-formed portions being shown in FIG. 3 in hatched lines). As a consequence, and as shown in FIG. 4 of the drawings, the terminal portion 20 has been converted into an inwardly directed peripheral flanged end portion 45 which bears against the terminal peripheral rib 30 and is, in fact, welded to this rib, thereby effectively sealing and retaining the inner portion 26 within the outer portion 11. Peripheral flanged end portion 45 is directed at an angle of between 70° and 110° with respect to the cylindrical wall of outer member 11, this angle preferably being substantially equal to 90°.

By virtue of this construction and the mode of assembly just described, the following distinct advantages are obtained with fluid flow control units in general, and with irrigation emitter units in particular, as compared with known units:

1. By eliminating the necessity to provide the outer member with an undercut, the overall height of the outer member, and in particular of the coupling terminal portion thereof, is effectively reduced and, in consequence, the upper terminal edge of the outer member can, as shown in FIG. 4 of the drawings, be made coplanar, or even slightly below the corresponding surface of the inner member, and in this way there is avoided the undesirable production of a water accumulating recess which characterised known emitter units as described above with reference to FIG. 1;

2. By virtue of the fact that the inner member is effectively retained within the outer member by means of a retaining flange 45 which is directed substantially at right angles with respect to the cylindrical portion 12 of the outer member, the inner member is effectively retained within the outer member even though high relative pressures may be generated within the unit (this being possible with pressure controlled emitter units of the kind described), these pressures giving rise to upwardly directed forces acting on the peripheral retaining flange 45. Thus, it is possible to ensure this effective retention even with an outer member which is formed of relatively thinner, and therefore cheaper, materials as compared with the prior art units, where the outer member had to withstand radially directed forces and therefore had to be constructed of much more substantial materials. This form of retention with a substantially perpendicularly directed retaining flange 45 can be compared with the unsatisfactory retention in accordance with the prior art involving the use of an undercut having sloping edges;

3. By virtue of the fact that the retaining flange 45 is effectively welded to the peripheral rib 30, the unit as a whole is effectively protected against undesirable opening arising out of pressures generated within the unit, which could cause an outwardly directed distortion of the outer member. At the same time, effective sealing of the flow reducing flowpath and the unit as whole against leakage therefrom, is ensured.

In addition to these particular advantages which result from the form of retaining of the inner member within the outer member, the emitter unit construction just described has the following distinct advantages:

(1) The location of the membrane 37 as shown in the drawings enables it to act as a sealing barrier against return flow of water from the outside though the outlet aperture 27 to the inlet port 15, and this by virtue of the fact that the circular bearing surface 18 bears sealingly against the under surface of the membrane 37;

(2) Again by virtue of the specific construction, displacement of the membrane 37 away from the bearing surface 18 so as to allow for throughflow of irrigation water from the inlet port 15 via the inlet control chamber 16 and into the flow reducing path 33, will only take place after a minimum pressure has developed in the inlet port 15 and inlet control chamber 16, after which the membrane 37 flexes upwardly, thereby allowing flow of water from the inlet control chamber 16 into the annular chamber 34 and from there into the throughflow path 33. Thus, once this takes place the central portion of the inlet control chamber 16 combines with the annular chamber 34 to form a unitary inlet control chamber whilst the membrane 37 is held against the shoulder 35 solely under the influence of the fluid pressure. Thereafter, the emitter unit operates in a well-known fashion such as, for example, as described in our prior U.S. Pat. No. 4,209,133 to which attention is directed and whose disclosure is hereby incorporated by way of reference, so as to effect differential pressure control on the outflow rate of the irrigation water through the outlet aperture 27;

(3) By virtue of the fact that the lower portion 29 of the inner member 25 is securely located within the annular groove 19, the entire skirt portion 28 is secured against any radial pivotal displacement under the influence of water pressure and, in this way, the effective sealing at all times of the skirt portion 28 against the inner surface of cylindrical portion 12 is ensured, thereby ensuring that a well-defined, invariant throughflow path 33 is obtained;

(4) The provision of the unit with a tapering base portion 14 contributes considerably to the strengthening of the unit as a whole and, by virtue of the fact that this tapering portion 14 is located within a correspondingly downwardly sloping portion of the irrigation pipe into which it is fitted (as seen in FIG. 4 of the drawings), the provision of this tapered portion does not in any way result in any increase in the effective height of the emitter unit.

Whilst in the embodiment specifically described above the application of the invention has been described with respect to a pressure controlled irrigation emitter unit, the principles just described can equally well be applied to other forms of flow control units.

We claim:

1. An irrigation emitter unit comprising:
   an outer member of substantially cylindrical shape and having an outer member base portion formed integrally with fluid flow coupling means communicating with a fluid flow inlet formed in the base portion;
   an inwardly directed peripherally flanged edge portion of the outer member directed at substantially 90° with respect to cylindrical walls of the outer member;
   an inner member having a body portion of substantially cylindrical shape substantially sealingly fitted within the outer member with an inner member base portion thereof abutting against an inner surface of said outer member base portion and having a cover portion formed integrally therewith;
   said inner and outer members being formed of like plastics materials;
   a peripheral edge portion of the cover portion juxtaposed below said flanged edge portion of the outer member and sealingly welded thereto at their juxtaposed surfaces;
   an elongated groove formed in an outer cylindrical surface of the inner member body portion and defining with a contiguous inner surface of the outer member a flow restricting flowpath;
   a cavity formed in said outer member body portion and communicating at one end thereof with said fluid flow inlet and, at an opposite end thereof, with a fluid flow outlet formed in said cover portion;
   an inwardly directed flange formed integrally with the walls defining said cavity at an intermediate position along the axial extent thereof and having a flange rim defining an opening having an area substantially greater than the area of said fluid flow outlet, said flange rim being spaced from the fluid flow outlet;
   a resiliently flexible membrane located within the unit and adapted to be held against said flange rim so as to close said opening and so as to define with the cavity walls an inlet control chamber communicating with said fluid inlet and one end of said flow restricting flowpath and an outlet control chamber communicating with said fluid flow outlet and with an opposite end of said flow restricting flowpath;
   the arrangement being such that upon the fluid pressure in the inlet control chamber exceeding the fluid pressure in the outlet control chamber by a predetermined amount, the membrane flexes elastically towards the fluid flow outlet so as to define, with an outlet aperture rim, a restricted outflow path thereby limiting variations in the outflow rate.

2. An irrigation emitter unit according to claim 1, wherein said inwardly directed flange is formed within said outer member and is comprised of a tapering annular membrane support portion having a terminal circular apex bearing against an under surface of said membrane whereby, and prior to exertion of a minimum fluid pressure on said under surface, the latter bears sealingly against said apex and an upper surface thereof bears sealingly against the rim of said flange.

3. An irrigation emitter unit according to claim 1, wherein said outer member base portion is of tapering construction.

4. An irrigation emitter unit according to claim 2, wherein said outer member base portion is of tapering construction.

* * * * *